United States Patent
Lindholm et al.

(10) Patent No.: US 7,385,609 B1
(45) Date of Patent: Jun. 10, 2008

(54) APPARATUS, SYSTEM, AND METHOD FOR INCREASED PROCESSING FLEXIBILITY OF A GRAPHIC PIPELINE

(75) Inventors: John Erik Lindholm, Saratoga, CA (US); Henry Packard Moreton, Woodside, CA (US); Rui M. Bastos, Porto Alegre (BR)

(73) Assignee: NVIDIA Corporation, Santa Clara, CA (US)

( * ) Notice: Subject to any disclaimer, the term of this patent is extended or adjusted under 35 U.S.C. 154(b) by 353 days.

(21) Appl. No.: 10/980,288

(22) Filed: Nov. 2, 2004

(51) Int. Cl.
G06T 1/20 (2006.01)

(52) U.S. Cl. ...................................... 345/506; 345/501

(58) Field of Classification Search ................ 345/501, 345/506, 557
See application file for complete search history.

(56) References Cited

U.S. PATENT DOCUMENTS

| | | | | |
|---|---|---|---|---|
| 5,878,216 | A * | 3/1999 | Young et al. | 709/208 |
| 6,003,098 | A * | 12/1999 | Krech, Jr. | 710/51 |
| 6,476,816 | B1 * | 11/2002 | Deming et al. | 345/502 |
| 6,897,871 | B1 * | 5/2005 | Morein et al. | 345/501 |
| 2005/0243094 | A1 * | 11/2005 | Patel et al. | 345/506 |

* cited by examiner

Primary Examiner—Xiao Wu
Assistant Examiner—David Lin
(74) Attorney, Agent, or Firm—Cooley Godward Kronish LLP

(57) ABSTRACT

A graphics pipeline has at least one stage that determines operations to be performed on graphics data based at least in part on data processing attributes associated with the graphics data. One application is to permit one or more operations in a stage to be bypassed. Another application is a multi-function stage in which the data operations that are performed depend at least in part on the data type.

6 Claims, 8 Drawing Sheets

APPARATUS, SYSTEM, AND METHOD FOR INCREASED PROCESSING FLEXIBILITY OF A GRAPHIC PIPELINE

FIELD OF THE INVENTION

The present invention relates to graphics processing. In particular, the present invention relates to systems and methods for increasing the flexibility with which stages of a graphics pipeline process data.

BACKGROUND OF THE INVENTION

Graphics processing units (GPUs) are used in graphics system to process graphics data. GPUs are used, for example, to process three-dimensional (3-D) graphical images. A GPU is commonly implemented as a chip that receives a command stream from a central processing unit (CPU). GPUs typically have a pipeline architecture in which the processing operations are performed in a sequence of stages. These pipeline stages perform, for example, a predetermined sequence of vertex processing, geometry processing, and pixel processing. The individual stages are typically implemented in hardware and may also be programmable.

A conventional graphics pipeline offers a number of benefits that are derived from dedicating each stage to performing a specific function for one type of data (e.g., primitive data). There are, however, a number of disadvantages associated with the conventional pipelined GPU architecture. In particular, the conventional pipelined architecture constrains the manner in which data flows between stages and the manner in which data is interpreted and utilized by individual stages. For example, "choke points" can emerge in one or more stages of a graphics pipeline. A choke point may, for example, be a portion of a stage that is not functioning well enough to permit data from a previous stage to smoothly flow to a subsequent stage. Additionally, the conventional pipelined architecture places many restraints on data flow and data usage. Moreover, each stage in a conventional graphics pipeline typically interprets and utilizes data in narrowly defined ways determined by the dedicated function of the stage. For example, a triangle setup stage is typically responsible for calculating the slope of a triangle edge using the vertex information of the edge's two end points. Thus, the triangle setup expects to receive vertex information and outputs triangle information, typically in the form of a constant, an x-gradient, and a y-gradient.

For example, FIG. 1 illustrates one version of a prior art graphics pipeline 100. In this pipeline 100, a computer application 105, such as a game program, passes graphical data to the pipeline 100. Typically, this graphical data is in the form of geometric shapes known as primitives. Basic primitives include points, lines, triangles, and quadrangles. Note that for the case of a point, a point can be rasterized as a triangle (or triangles), a quad, or a square. Headers included with each primitive indicate what type of primitive the application is passing to the pipeline. Typically, the application passes graphical data to the pipeline as a set of triangle vertices.

Graphical data is initially received at a front end stage 110 of the graphics pipeline 100. The front end stage 110 could be an interface between the GPU and other computer components and can be responsible for identifying the type of primitive received from the application. Once the front end stage 110 receives a primitive, it can pass the primitive to a geometry stage 115 that is responsible for basic transformations (e.g., rotation, translation, and scaling), space-to-space transformations, culling, clipping, etc. Depending upon the hardware implementation of the graphics pipeline 100, some of these operations could be performed in other stages of the pipeline, and other operations could be performed in the geometry stage 115.

After a received primitive has been manipulated by the geometry stage 115, the processed data is passed down the pipeline to the triangle setup stage 120. The triangle setup stage 120 is generally responsible for calculating the slope of a triangle edge using the vertex information of the edge's two end points. Slope information is only meaningful with certain primitives, such as triangles and lines. Nonetheless, because modern 3-D graphics pipelines assume that all graphical primitives are associated with slope data, the triangle setup stage 120 will attempt to process the slope for all primitives, even those without slopes. For example, if the primitive is a point, the triangle setup stage 120 will still attempt to process the non-existent slope information for the point and output a constant, an x-gradient, and a y-gradient. Because points have no slope, the slope information is treated as a null.

After the triangle setup stage 120 has completed its manipulation of the graphical data, the data is passed to the rasterization/setup stage 125. This passed data includes three components: a constant, an x-gradient, and a y-gradient. The triangle setup stage 120 can also pass these three components to a cache (not shown), such as a triangle RAM, so that the rasterization/setup stage 125 can later retrieve the data.

The rasterization/setup stage 125 is responsible for converting vectors associated with primitives into x-y coordinate representations. The rasterization/setup stage 125 can also be responsible for identifying the pixels touched by triangle edges and lines as well as for general pixel processing, including shading, shadowing, antialiasing, and depth buffering. As with the triangle setup stage 120, some of the operations performed by the rasterization/rendering stage are not necessary and are, in fact, wasteful for primitives without slope data. When a primitive does not include a slope component, it should not be rasterized. Modern 3-D graphics pipelines, however, assume that all primitives include slope data, and the rasterization/setup stage 125 will attempt to process all primitives accordingly.

Once the rasterization/setup stage 125 has rasterized the graphical data, that data can be further processed on the pixel level. For example, the individual pixels could be shaded. Antialiasing and z-buffering techniques could also be applied. Finally, the processed graphical data could be stored in the frame buffer 130 for further processing or subsequent display.

Referring now to FIG. 2, it illustrates a different implementation of a prior art graphics pipeline 140. The basic operation of this graphics pipeline 140 is similar to that described with relation to FIG. 1. In this pipeline, graphical data is passed to a vertex stage 145 that is generally responsible for manipulating the vertices associated with received primitives and, it is also responsible for caching vertex data for potential reuse. The vertex data is then passed to the geometry/transform and lighting stage 150 that is responsible for basic transformations, space-to-space transformations, and vertex shading. A vertex shader (not shown) may be coupled to geometry/transform and lighting stage 150 to perform the vertex shading. The output of the geometry/transform and lighting 150 stage is then passed to the triangle setup stage 160. As previously described, the triangle setup stage 160 calculates the slopes for triangle edges and lines-even if the passed graphical data is not associated with a slope. After attempting to calculate the slopes, the triangle setup stage 160 stores three entries in the triangle random access memory (RAM) 165: a constant, an x-gradient, and a y-gradient, all of which correspond to the primitive passed through the graphics pipeline 140. If the primitive is not associated with a slope, the triangle RAM 165 stores nulls for the x-gradient and y-gradient. Consequently, for a primitive with slope, the triangle RAM 165 stores three values. Unfortunately, for primitives without slope, the triangle RAM 165 also stores three values—two of which are stored needlessly.

Still referring to FIG. 2, the raster stage 170 can retrieve the values stored in the triangle RAM 165 and calculate the corresponding x-y coordinates. As previously described, rasterization is not necessary on certain types of primitives. Nonetheless, current 3-D graphics pipelines attempt to rasterize all primitives regardless of type.

Finally, the processed graphical data is passed to a pixel shader 175 where color is determined for individual pixels, and then the graphical data is passed to a raster operations stage (ROP) for final processing. The data can then be stored in a frame buffer or routed through the graphics pipeline 140 again.

It can be understood from the examples of FIGS. 1 and 2 that a conventional graphics pipeline imposes very strict limitations on the manner that graphics data is processed. Data typically flows sequentially from one stage to another and each stage tends to have very specific rules for how data is to be interpreted and processed. Moreover, each stage typically performs a comparatively narrow function. For example, conventionally there is a dedicated vertex shader at one point in the graphics pipeline and a separate pixel shader farther down the graphics pipeline. Similarly stages that perform data conversion are also dedicated to a specific data conversion functions such as reasterization and raster operations.

In light of above-described problems there arose the need to develop the inventive apparatus, system, and method described hereinafter.

SUMMARY OF THE INVENTION

One or more stages in a graphics pipeline are designed to support two or more different processing modes. The processing mode implemented by a stage on graphics data depends upon associated processing attributes, which includes a data type. As a result an individual stage may be configured to provide a processing function that depends upon the data type. One aspect of the present invention is to extend the capability of a graphics stage, such as a shader, to service different types of data, such as vertex data, geometry data, and pixel data. Another aspect of the present invention is to permit special data types to be defined so that special data operations to be performed in a stage, such as passing through data in a non-standard form or bypassing data processing operations.

One embodiment of a method for processing graphics data in a graphics pipeline includes receiving a unit of graphics data at a selected stage of a graphics pipeline. The graphics data may comprise one of a plurality of different types of data. The selected stage has two or more different processing modes. The selected stage selects a processing mode based on the data type.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

The present invention generally comprises techniques to increase the flexibility with which data may be processed in a graphics pipeline. One aspect of the present invention is that data processing attributes may be defined that permit individual stages of a graphics pipeline to adapt their mode of processing.

Figure 3:
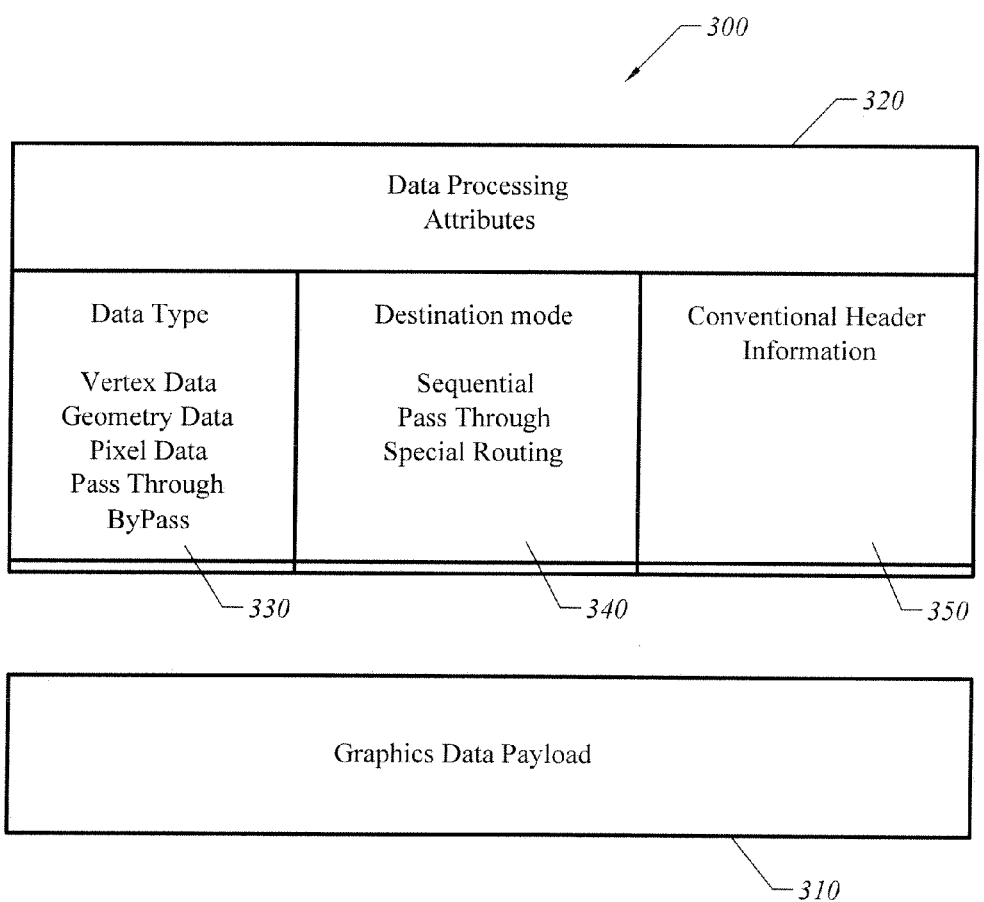
FIG. 3 is a diagram of a graphics data unit and associated data processing attributes in accordance with one embodiment of the present invention.

FIG. 3 is a diagram illustrating a data structure 300 for use with a graphics pipeline in accordance with one embodiment of the present invention. A unit of graphics data corresponds to a graphics data payload 310 or a pointer to the data. The graphics data payload 310 has associated data processing attributes 320. An exemplary set of data processing attributes includes a data type 330, destination mode 340, and conventional header information 350.

Data type 330 permits individual stages of a graphics pipeline to adapt their operation for different data types. The data type 330 may, for example, include different types of graphic data that are conventionally generated at different steps of graphics processing, such as a vertex data type, a geometry data type, and a pixel data type, to permit a stage to recognize the type of data that is being received. Additionally, data type 330 may indicate that the data type is a special data type requiring special processing. Examples of special data types include a pass through data type and a bypass data type. A default value (not shown) may be for the data type to be a standard data type. In one embodiment, additional information is associated with data type 330 to indicate the stage or stages for which the data type is applicable. In one embodiment a stage is adapted to interpret the data type 330 and execute an instruction for the data type that the stage is programmed to support. For example, a shader program may include a program store or an instruction cache (e.g., an L1 instruction cache) to implement a pre-selected instruction for each data type. Thus, a stage, such as a shader stage, may be programmed to detect the data type and select a processing mode in which a data processing operation is performed that is appropriate for the data type.

It will be understood that the data types in data type 330 may be selected for a particular hardware implementation to provide one unique data type for each different operating mode that a stage is configured to support. Consequently, a stage that receives graphics data having a particular data type is capable of selecting the corresponding operating mode appropriate for the data type.

A data type 330 may be sufficient to identify to a stage the operations that are to be performed for the data type and the destination for a data output. However, in some embodiments a destination mode 340 is included to indicate whether normal routing or special routing is to be used for the output of the stage. In one embodiment destination mode 340 is used to indicate a destination stage for graphics data.

Data processing attributes 320 may also include conventional header information 350. For example, conventional header information 350 may specify whether a primitive is a point, line, triangle, or quadrangle. In one embodiment conventional header information 350 includes a primitive list, where each primitive has a number of vertices.

Data processing attributes 320 may be included as a header or label sent with graphics data payload 310. However, in an alternate embodiment, a scheduling entity may keep track of some or all of the data processing attributes 320 associated with a particular graphics data payload 310.

Figure 4:
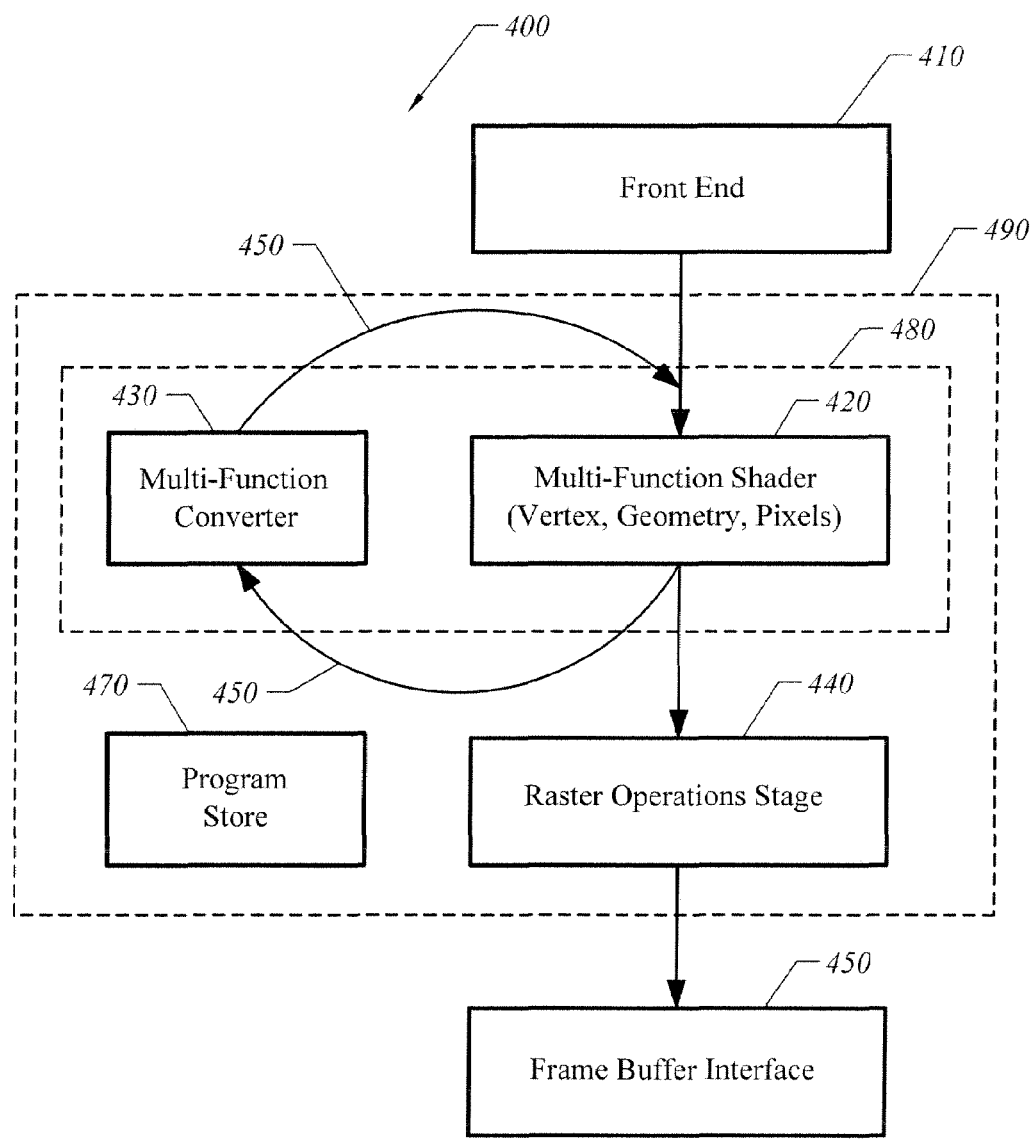
FIG. 4 is a block diagram of a first embodiment of a graphics pipeline in accordance with one embodiment of the present invention.

FIG. 4 illustrates a graphics processing unit (GPU) pipeline architecture 400 in accordance with one embodiment of the present invention. In this embodiment, at least one of the stages is a multi-function stage that provides the functionality that would conventionally be provided by two or more different stages dedicated to receiving and processing a single data type. In one embodiment each multi-function stage has a program store 470 that provides instructions for selecting a data processing operation appropriate for the data processing attributes 320 (e.g., the data type 330) associated with a graphics data payload 310.

A front-end stage 410 receives input graphics data, such as graphics instructions from a central processing unit. A multi-function shader stage 420 receives an output of front end stage 410. Multi-function shader stage 420 is adapted to perform shading operations for different graphics data types. In one embodiment multi-function shader stage 420 is configured to have a processing mode in which it performs vertex shading of vertex data, a processing mode for geometry shading of primitive data, and a processing mode for pixel shading of pixel data.

A multi-function converter stage 430 performs conversion operations utilized to convert from one data type to another. In one embodiment multi-purpose converter stage 430 performs, for example, a conversion of vertex data to geometry data in a first processing mode and a conversion of geometry data to pixel data in a second processing mode.

A raster operations (ROP) stage 440 performs raster operations on shaded pixel data received from multi-function shader stage 420. An output of raster operation stage 440 is coupled to a frame buffer interface 450.

Arrow 460 illustrates an exemplary data path. Data received from front end 410 loops through the multi-function shader stage 420 and multi-function converter stage 430 until all of the requisite shading and data conversions are performed prior to raster operations stage 440.

In one embodiment the data processing attributes 320 are updated in each pass through multi-function shader stage 420 and multi-function converter stage 430. In embodiments in which data processing attributes 320 are included in a header, each stage may be in charge of updating the data processing attributes. Alternatively, as previously described a scheduler (not shown) or other entity may keep track of the status of data processing attributes 320 and inform other stages of the current status.

As previously described, in the embodiment of FIG. 4 at least one of the stages is a multi-function stage that provides the functionality that would conventionally be provided by two or more different stages dedicated to receiving and processing a single data type. Note that a further reduction in the number of stages can be achieved by adapting the multi-function shader 420 to perform other types of operations in addition to shading operations. In particular, the number of data types 330 may be expanded to permit a multi-function shader to perform operations ordinarily handled by other stages, such as operations handled by multi-function converter 430 or raster operations stage 440. In one embodiment a multi-function shader 480 also performs the function of multi-function converter 430 in addition to the previously described shading operations. In this embodiment multi-function shader 480 is programmed to recognize a data type requiring a data conversion operation and perform the appropriate conversion operation. In another embodiment, a multi-function shader stage 490 performs the function conventionally performed by raster operations stage 440 in addition to the previously described shading operations. In this embodiment, one of the data types 330 may be a ROP data type and multi-function shader stage 490 is adapted to perform pixel processing, including read-modify-write operations, that would conventionally be performed by ROP stage 440. Thus, it will be understood that in one embodiment a multi-function shader stage 490 processes vertices, geometry, fragments, and pixels.

Figure 5:
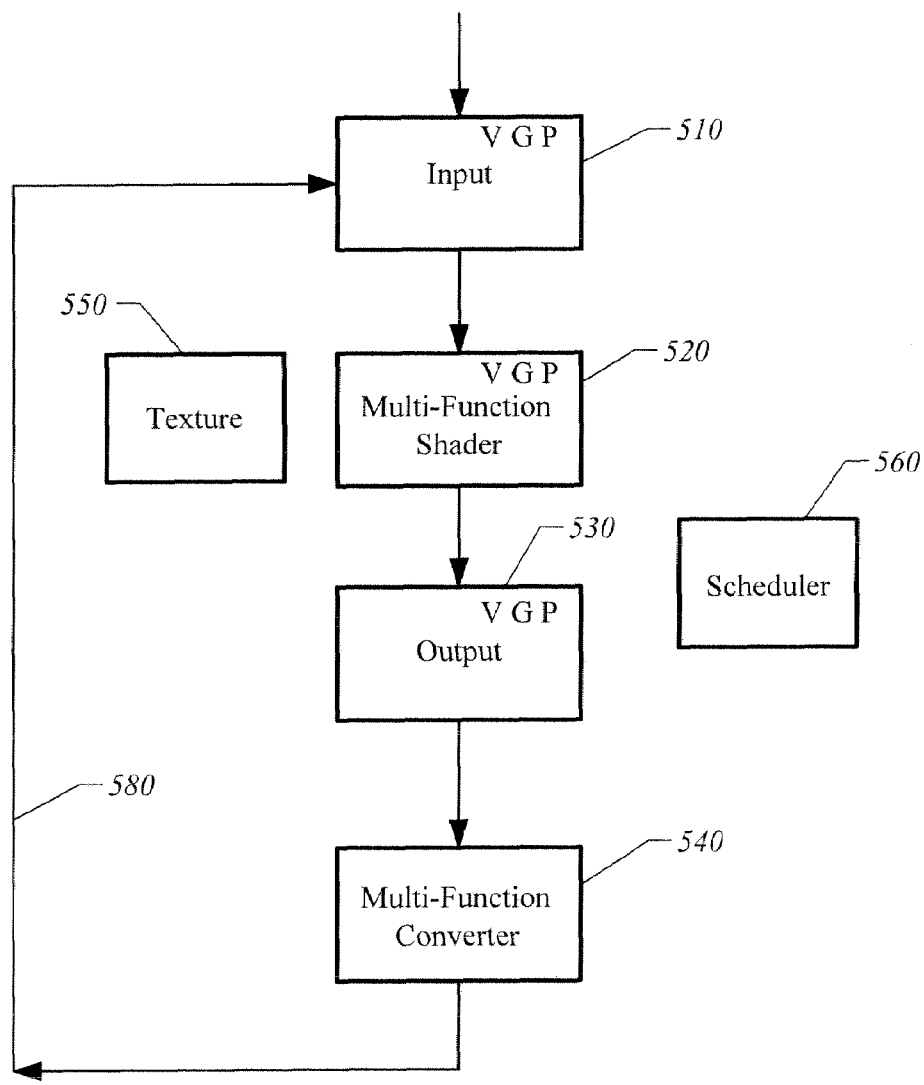
FIG. 5 is a block diagram of a second embodiment of a graphics pipeline in accordance with one embodiment of the present invention.

FIG. 5 illustrates a graphics pipeline in accordance with another embodiment of the present invention. An input stage 510 receives inputs. The inputs may be physically separate inputs corresponding to vertex data (V), geometry data (G), and pixel data (P). A multi-function shader 520 is used to provide vertex shading, geometry shading, and pixel shading. An output stage 530 has V, G, and P inputs for vertex, geometry, and pixel inputs, respectively. A multi-purpose converter stage 540 includes conversion functions for each data type, such as a setup/raster function, vertex to geometry data conversion, and pixel to frame buffer conversion. A texture unit 550 may be provided to perform texture operations.

In one embodiment a scheduler 560 is provided to inform multi-purpose shader stage 520 and multi-function converter stage 540 of the current data type. The scheduler may, for example, keep a record of new inputs to input stage 510 and the outputs of converter stage 540 to a frame buffer. As indicated by recirculation path 580, data is recirculated to permit multi-function shader stage 520 to perform vertex shading, geometry shading, and pixel shading. Similarly, recirculation path 580 permits multi-function converter stage 540 to perform the different types of data conversion required at different points in the processing. The data is thus routed back through recirculation path 580 until the required number of shader operations and data conversions are performed.

Figure 1:
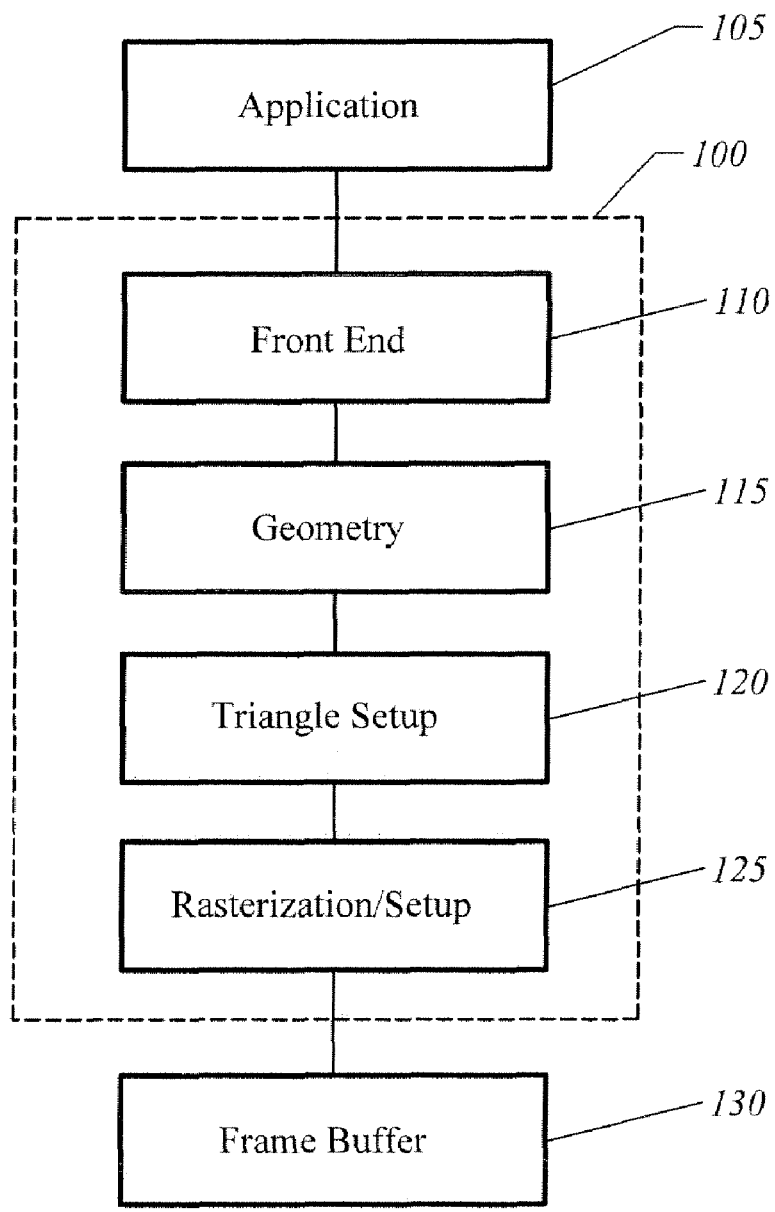
FIG. 1 is a block diagram of a prior art graphics pipeline.
Figure 2:
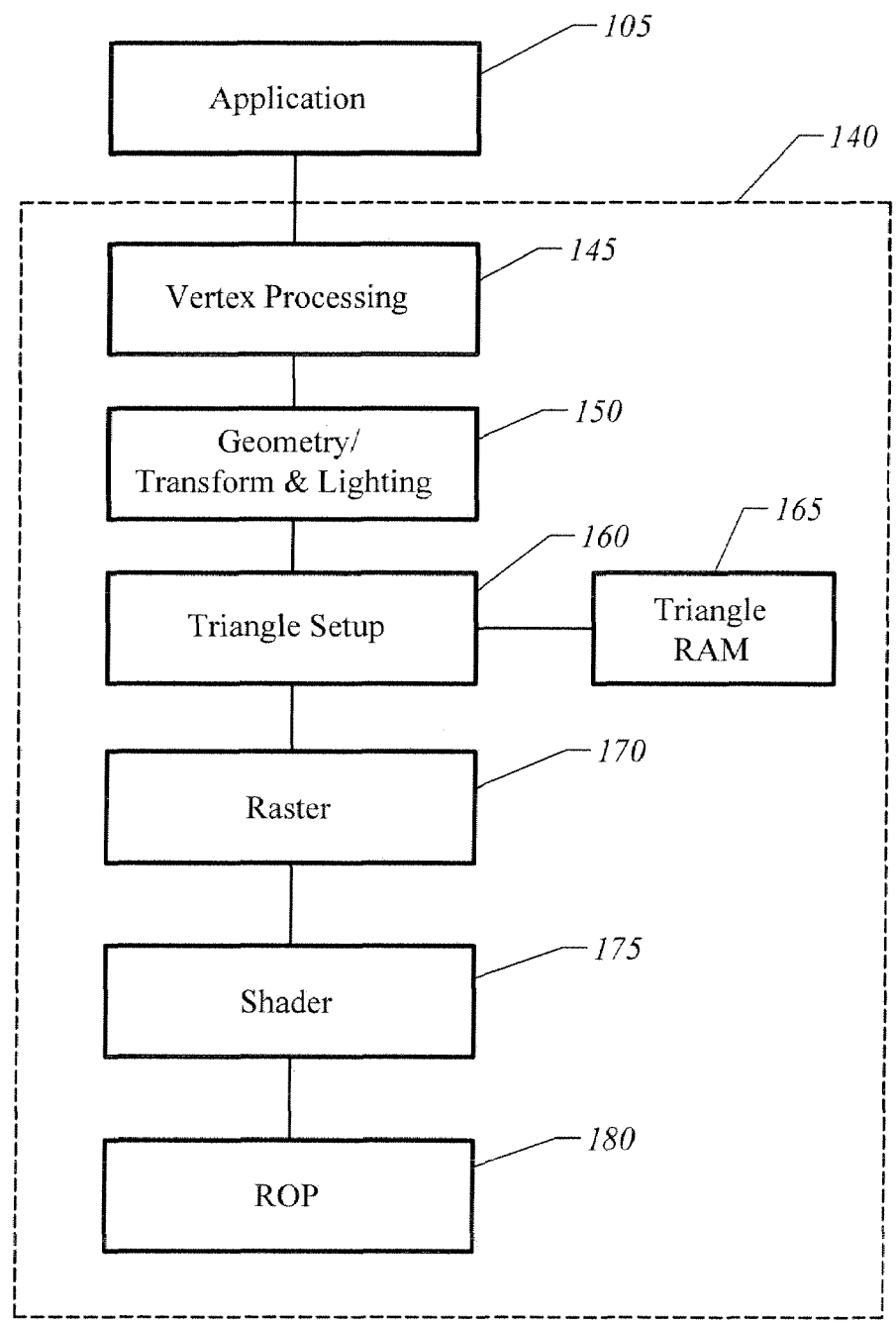
FIG. 2 is a block diagram of a prior art graphics pipeline.
Figure 6:
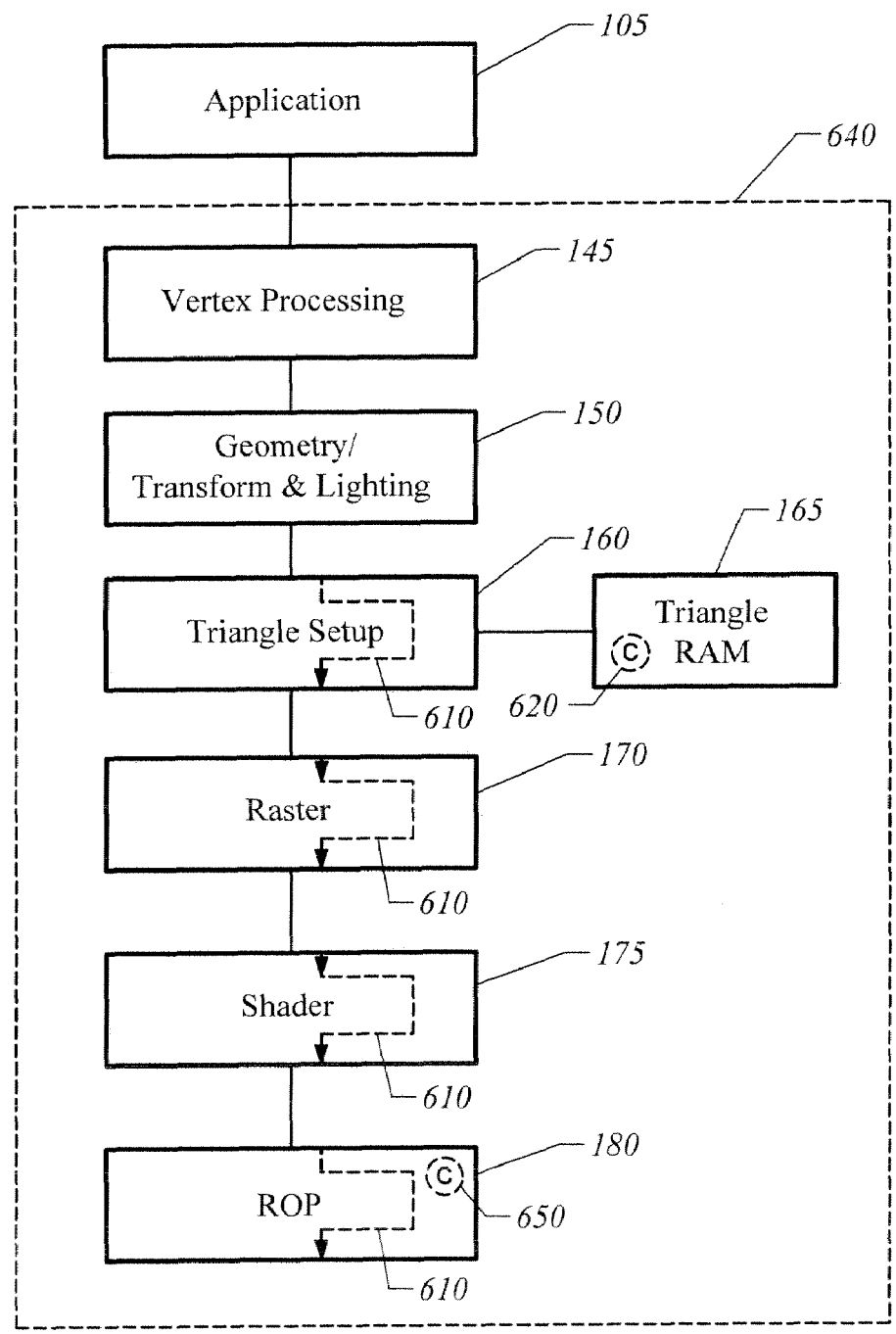
FIG. 6 is a block diagram of a third embodiment of a graphics pipeline in accordance with one embodiment of the present invention.

Referring to FIG. 6, an exemplary graphics pipeline 640 is shown. In this example, the pipeline has a conventional mode of operation in which each stage operates in a conventional manner as previously described in regards to FIGS. 1 and 2. However, one or more of the stages are configured to recognize a pass through data type or a bypass data type. As indicated by dashed lines 610, the pass through data type and the bypass data type triggers a special processing mode in a stage supporting a pass through mode or a bypass mode. Thus, an individual stage provides a conventional processing function for conventional data types but may also provide special processing functions for the pass through and bypass data types.

For the pass through data type one or more processing operations may be suspended or bypassed when the stage is operating in the pass through mode. Additionally, the pass through data type may also trigger special data processing or storage. The pass through data type permits, for example, data in formats other than the conventional mode to be received and data to be interpreted, processed, and stored in ways that are different compared with graphics data received in the conventional mode. Thus, for example, the pass through mode permits copies 620 and 650 to be stored in triangle RAM 165 or ROP stage 180. As an illustrative example, in some applications it may be desirable to store other types of information in a triangle RAM besides slope information. The pass through mode permits data that is not in a standard slope format to be sent to a triangle RAM, such as per-pixel information, constants, higher order surfaces, interpolated values, per-pixel information, and barycentric data. Thus, one application of the pass-through data type is to define graphics data that is intended to be stored at a stage in a pipeline and suspend data processing operations that would reduce the efficiency with which the pass-through data can be transmitted and stored in the destination stage.

For the bypass data type, processing operations are bypassed. The bypass data type triggers a stage that supports a bypass mode bypasses processing. In one embodiment, in the bypass mode the graphics data is passed through an intervening stage without processing until the graphics data reaches a destination stage. Alternatively, the bypass mode may be used to trigger a bypass around intervening stages by directing data along a bypass path (not shown). The destination stage may be defined, for example, in a variety of ways, such as by the destination mode 340. The bypass mode improves the speed and efficiency with which data can be sent to a destination stage. For example, the bypass mode may be used to implement a direct write to any stage in a standard or special data format. This permits, for example a direct write to a frame buffer using a frame buffer interface (not shown). As another example, it may be desirable in some applications to send data directly to a raster operations module or frame buffer with no processing at intervening stages. This permits, for example, bypassing a pixel shader to pass data to a ROP or frame buffer. As another example, in some applications it may be desirable to bypass a stage for speed reasons. For example, it may be desirable to bypass a stage that performs an unnecessary operation or to bypass a chokepoint.

Figure 7:
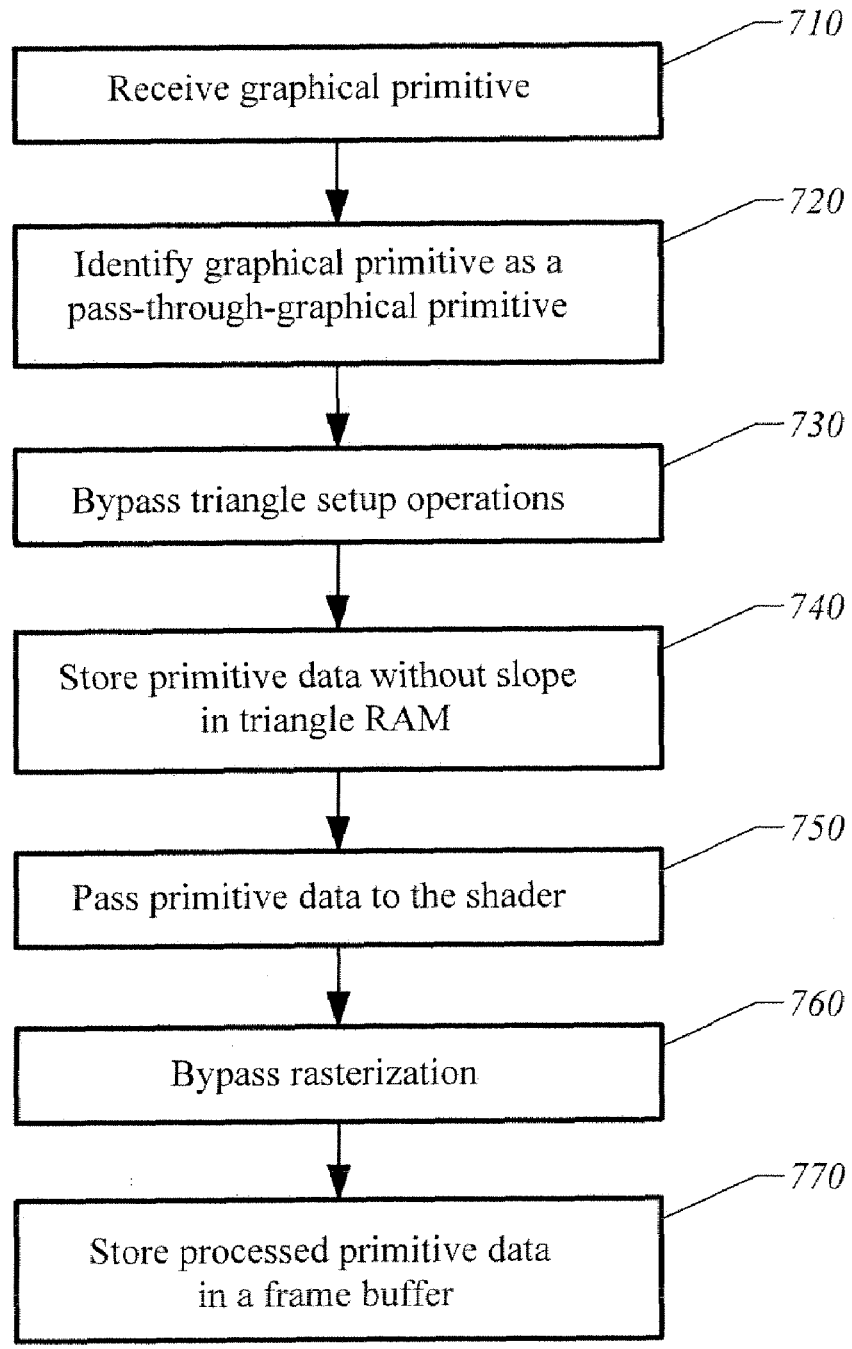
FIG. 7 is flow chart for a method in accordance with one embodiment of the present invention.

FIG. 7 is a flowchart showing an exemplary method for use in the graphics pipeline of FIG. 6. Primitives are routed inside the GPU to the graphics pipeline where the type of primitive is determined by reading the header. (Blocks 710 and 720) The primitive includes a header and a payload. The header indicates the type of primitive and the payload includes the graphical information. For example, the header could indicate that the primitive is a triangle, line, point, quadrangle, or pass-through, and the payload would include the corresponding graphical information.

The methods for processing triangle, line, point and quadrangle primitives are well known in the art and those methods are not discussed in detail herein. Generally, the graphics pipeline assumes that all primitives are associated with slope information and attempts to process and store slope information even if it is not present. For example, if the primitive type is a "point," the graphics pipeline would assume that the point had an associated slope value even though points do not have slope values. Similarly, if the payload includes raw pixel data, the graphics pipeline would still assume that the payload includes slope information.

In one embodiment of the present invention, when the graphics pipeline, or the individual stages therein, identifies the received primitive as a pass-through graphics primitive, operations involving slope are bypassed. The graphics pipeline, in essence, suspends the assumption that all primitives are associated with slope responsive to determining that a primitive is a pass-through-graphics primitive.

For example, a pass-through-graphics primitive can be passed to a geometry unit where some operations, such as transformations, can be performed. These operations would be independent of any slope calculations. After the geometry unit processed the primitive, it would pass the output to the triangle setup unit. (Block 730) Because the triangle setup unit primarily performs calculations using slope data, the pass-through-graphics primitive would pass through, or bypass, the triangle setup unit, thereby reducing the number of operations necessary to process the primitive. The graphics data could then be stored in the triangle RAM. (Block 740) Normally, all primitive data stored in the triangle RAM is associated with slope and is stored in a three part format: constant, x-gradient, and y-gradient. However, in the present invention, data associated with pass-through-graphical primitives is written to the triangle RAM as a single entry, thereby tripling the amount of storage capacity for pass-through graphical primitives. That is, the triangle RAM stores pass-through-graphics primitives without storing slope data.

Still referring to the above example, other parts of the 3-D graphics pipeline can retrieve the data stored in the triangle RAM and process accordingly. For example, the shader unit and the raster operations unit (ROP) could retrieve and further process the pass-through-graphics primitive. (Block 750) Finally, the processed data could be written to the frame buffer for subsequent use or further processing. (Block 760)

Notably, the raster unit, which calculates x-y coordinates using slope information would not need to rasterize pass-through-graphics primitives. Consequently, the raster unit of the present invention will not necessarily rasterize pass-through-graphics primitives. (Block 770) Instead, the raster unit can determine whether a primitive is a pass-through-graphics primitive by reading the header associated with the primitive and pass through any such primitive. Alternatively, the raster unit can be notified by other stages of the pipeline about the type of primitive being processed in the pipeline and then pass through the primitive if appropriate.

Figure 8:
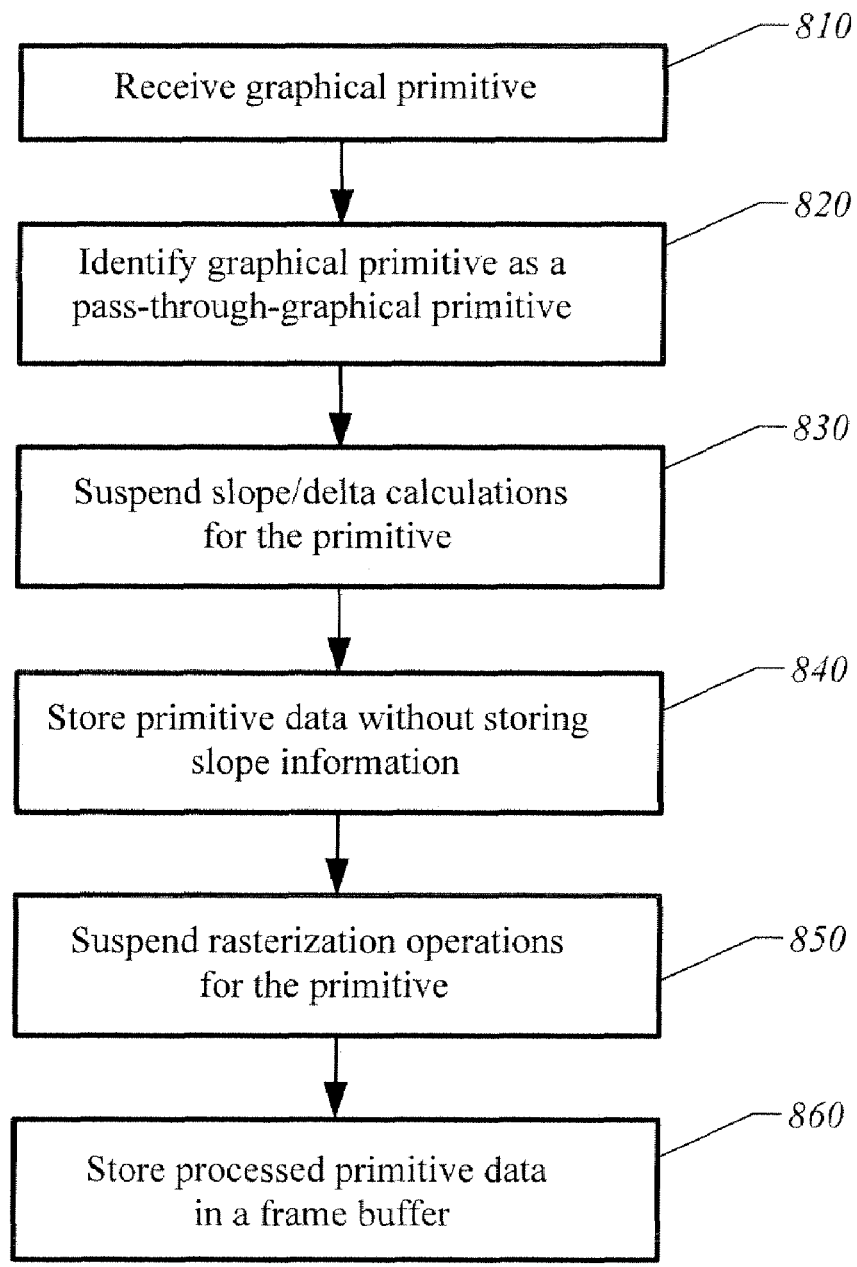
FIG. 8 is a flow chart for a method in accordance with one embodiment of the present invention.

FIG. 8, illustrates an alternate method for processing a pass-through-graphics primitive. In this embodiment, the 3-D pipeline initially receives a pass-through-graphics primitive. (Blocks 810 and 820) This primitive is passed through the pipeline such that it bypasses typical slope/delta calculations generally associated with the triangle unit and is stored in a cache without slope information. (Blocks 830 and 840) The primitive is then passed through the remaining portion of the pipeline—bypassing rasterization. (Block 850) Finally, the processed graphical data is stored in the frame buffer for additional processing or subsequent display. (Block 860)

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for processing graphics data in a graphics pipeline, the method comprising:
   at a triangle setup stage of said graphics pipeline, receiving a unit of graphics data;
   at said triangle setup stage, selecting a processing mode based on a data type of said unit of graphics data and writing an output of the triangle setup stage to a triangle random access memory (RAM) for use by downstream stages of the graphics pipeline;
   wherein said triangle setup stage acts as a multi-function stage that adjusts its processing mode based on said data type with a slope calculation being performed for the data type being a standard data type such that the output is stored in a first format in said triangle RAM that includes a slope data field; the slope calculation being bypassed for the data type being a pass through data type with the output for the pass through data type being stored in said triangle RAM in a second format that does not include a slope data field;
   wherein said first format is a format having three fields that includes slope information and said second format is a format having a single field to triple the storage capacity in the triangle RAM for the pass through data type.

2. The method of claim 1, further comprising for the pass through data type, receiving data from the triangle RAM in a downstream stage for special processing to generate processed data, bypassing rasterization in a raster stage, and storing the processed data in a frame buffer.

3. The method of claim 2, wherein for said standard data type, the units of graphics data are processed as triangles whereas for said pass through data type the units of graphics data are not processed as triangles.

4. The method of claim 1, further comprising: wherein for said standard data type, the units of graphics data are processed as triangles whereas for said pass through data type the units of graphics data are not processed as triangles.

5. A graphics pipeline, comprising:
   a multi-function triangle stage, said triangle stage operative to provide a processing operation to received graphics data based on an associated data type;
   a triangle random access memory (RAM) to cache data from said multi-function triangle stage;
   said multi-function triangle stage for a standard data type performing a slope calculation and writing an output to said triangle stage in a first format that includes a field for slope data;
   said multi-function triangle stage for a pass-through data type bypassing a slope calculation and writing an output to said triangle stage in a second format that does not include a field for slope data;
   wherein each different type of graphics data is processed differently in said multi-function triangle stage and stored in said triangle RAM in a different format;
   wherein said first format is a format having three fields that includes slope information and said second format is a format having a single field to triple the storage capacity in the triangle RAM for the pass through data type.

6. The graphics pipeline of claim 5, further comprising a shader stage and a raster stage, wherein for the pass through data type rasterization is bypassed, special shader processing is performed in the shader stage, and the processed graphics data is written to a frame buffer.

* * * * *